United States Patent [19]

Aysta et al.

[11] Patent Number: 5,264,184
[45] Date of Patent: Nov. 23, 1993

[54] DEVICE AND A METHOD FOR SEPARATING LIQUID SAMPLES

[75] Inventors: James E. Aysta, Stillwater, Minn.; Metin Colpan, Erkrath, Fed. Rep. of Germany

[73] Assignee: Minnesota Mining and Manufacturing Company, St. Paul, Minn.

[21] Appl. No.: 671,448

[22] Filed: Mar. 19, 1991

[51] Int. Cl.[5] .................. B01L 11/00; B01D 29/00
[52] U.S. Cl. .................. 422/101; 210/473; 210/474; 210/477; 210/482
[58] Field of Search ............ 422/101; 210/473, 474, 210/477, 482, 472

[56] References Cited

U.S. PATENT DOCUMENTS

| | | | |
|---|---|---|---|
| 3,608,736 | 9/1971 | Wong | 210/477 |
| 4,090,850 | 5/1978 | Chen et al. | 422/71 |
| 4,208,194 | 6/1980 | Nelson | 55/158 |
| 4,406,786 | 9/1983 | Hein | 422/101 X |
| 4,427,415 | 6/1984 | Cleveland | 436/57 |
| 4,485,015 | 11/1984 | Smith | 210/472 X |
| 4,642,220 | 2/1987 | Bjorkman | 422/101 |
| 4,699,717 | 10/1987 | Riesner et al. | 514/44 X |
| 4,777,021 | 10/1988 | Wertz et al. | 422/101 |
| 4,810,381 | 3/1989 | Hagen et al. | 428/305.5 X |
| 4,815,619 | 3/1989 | Turnef et al. | 604/415 X |
| 4,832,842 | 5/1989 | Limb | 210/477 X |
| 4,859,336 | 8/1989 | Savas et al. | 210/472 X |
| 4,902,481 | 2/1990 | Clark et al. | 422/101 |
| 4,927,604 | 5/1990 | Mathus | 210/474 X |
| 5,048,957 | 9/1991 | Berthold et al. | 356/246 |
| 5,116,496 | 5/1992 | Scott | 422/101 X |

FOREIGN PATENT DOCUMENTS

| | | |
|---|---|---|
| 0321064 | 6/1989 | European Pat. Off. . |
| 0359249 | 3/1990 | European Pat. Off. . |
| 2369557 | 5/1978 | France . |

Primary Examiner—Robert J. Warden
Assistant Examiner—T. A. Trembley
Attorney, Agent, or Firm—Gary L. Griswold; Walter N. Kirn; Lorraine R. Sherman

[57] ABSTRACT

A device (10) for separating liquid samples has a sample container (12), bottom wall (20) of which has an outlet opening (22) provided therein. The outlet opening (22) is joined by an outlet spout (24) extending in the axial direction of the sample container (12). On bottom wall (20) there is a separation layer (28). Below sample container (12), a collecting container (32) is arranged abutting sample container (12) such that an exchange of air between the interior of the collecting chamber (32) and the environment is possible, yet an escape of liquid is largely inhibited. The contact surface between collecting chamber (32) and sample container (12) and end (26) of the outlet spout (24) through which the liquid is discharged, are axially spaced apart.

24 Claims, 3 Drawing Sheets

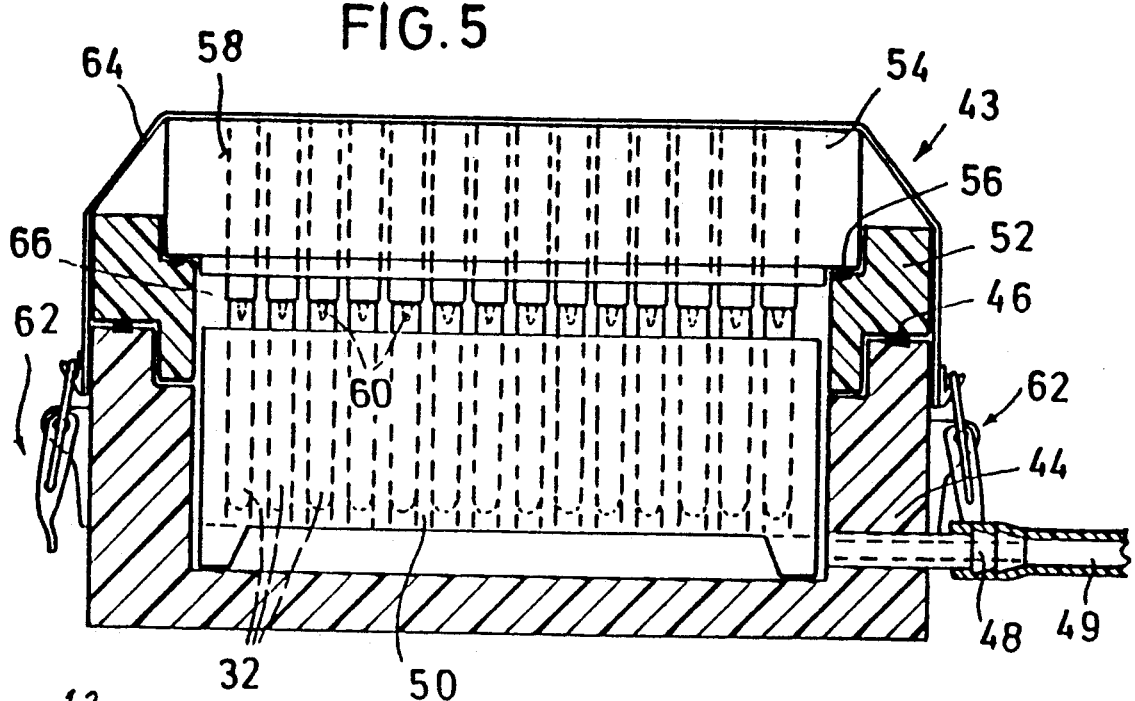
FIG. 5
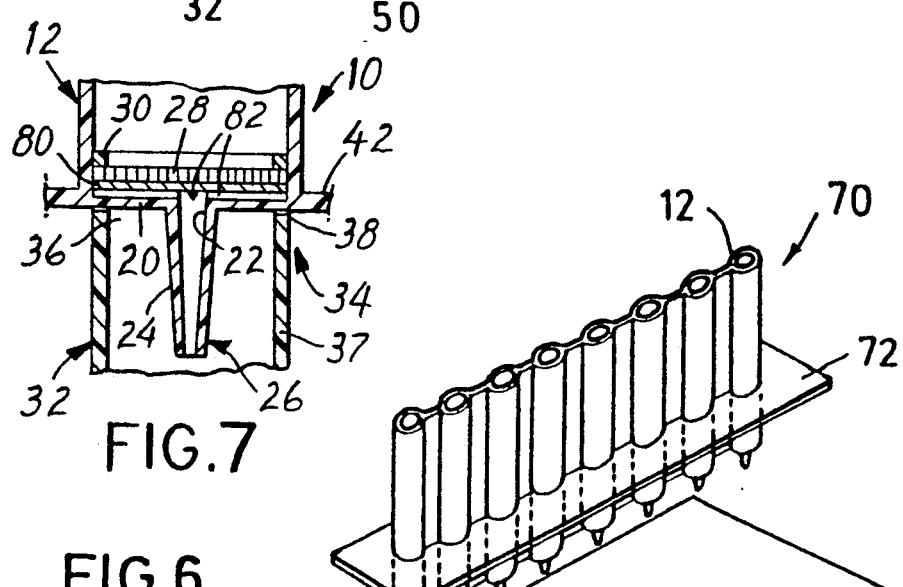
FIG. 7
FIG. 6
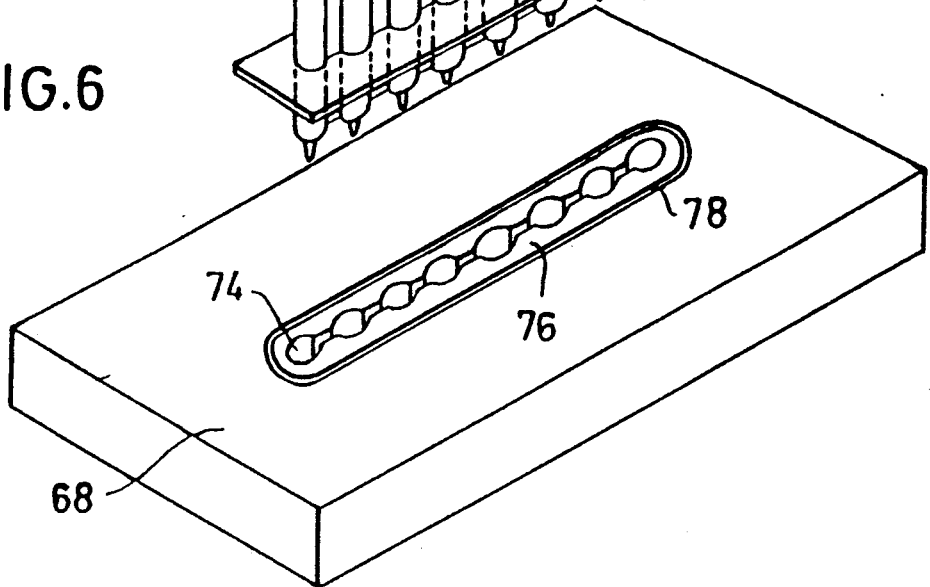

DEVICE AND A METHOD FOR SEPARATING LIQUID SAMPLES

FIELD OF THE INVENTION

The invention relates to a device for separating liquid samples, the device comprising a sample container having an inlet and an outlet opening between which a separation layer is arranged, the outlet opening being connected to and enclosed by an outlet spout, the device further comprising a collecting container having an opening therein for receiving liquid discharged from the outlet spout.

BACKGROUND OF THE INVENTION

Multiwell filtration devices have been disclosed in U.S. Pat. Nos. 4,777,021 and 4,427,415. Both reference devices have in common that liquid drops of samples penetrating separation layers will enter a common collecting vessel that is part of a vacuum chamber that is sealed by a support plate interconnecting the individual sample containers arranged in a matrix-like manner. In the reference device for separating liquids, the sample components retained by or in the separation layer are of interest in the subsequent tests. The liquid penetrating the separation layer is "lost" for further analyzing purposes. However, it is frequently necessary for a chemical or bio-polymer separation of samples to individually and selectively catch the sample components that have penetrated the separation layer or have been washed out or removed from the separation layer by applying a solvent. This cannot be realized by using the reference devices.

U.S. Pat. No. 4,902,481 discloses a multi-well filtration apparatus for the assay of microliter quantities. The apparatus is a filter which is positioned in each well on a plate having an open spout positioned in the plate. The spout has a collar on its outer surface extending in a direction perpendicular to the vertical axis of the spout. The collar prevents a liquid droplet from climbing the outer surface of the spout from its open end.

In the '481 patient, the individual collecting containers are only a small distance apart. Due to the distance of the collecting containers to the sample containers, there is a risk that parts of a fluid drop to be received by a collecting container, arranged below a sample container, will enter a neighboring collecting container, thereby contaminating the filtrate thereof. Further, the forming of the drops may not be uniform in the device of U.S. Pat. No. 4,902,481. In particular, it is not uniform when the vacuum in the chamber is released for a short time in order to replace the set of collecting containers accommodated therein by a new one. When releasing the partial vacuum in the chamber, the lower surface of the plate can become wetted by the liquid drops. When a partial vacuum is generated subsequently, relatively large drops 11 form since sucked-in liquid expands along the lower surface because the same is wetted. In this case, a drop may extend up to the annular collar, where it can be suctioned off via the gap between the annular collar and the collecting container. Thus, the liquid does not get into the collecting container, but may possibly run into an adjacent collecting container (contamination) or flows along the outside of the respective collecting container. Contamination of the liquid drops received by the collecting containers is particularly intolerable in the bio-polymer separation of liquid samples since, in this event, the examination of nucleic acids and proteins can be performed after a plurality (25 to 40) of self-replicating cycles, for example in a polymerase chain reaction (PCR), whereby even slight contaminations (contaminations of 1:1000) will be magnified and thus lead to erroneous results in the

SUMMARY OF THE INVENTION

Briefly, the present invention provides a device for separating a liquid sample, comprising a sample container having an inlet opening and an outlet opening between which a separation layer is arranged, said sample container having a bottom wall, a collecting container for liquid emerging through said outlet opening, having a tubular wall and a rim which defines an opening therein, and an outlet spout joining and enclosing said outlet opening, and wherein said collecting container abuts at least one of said sample container and said outlet spout adjacent to said rim, without providing an airtight sealing, and an end of said outlet spout extending through said opening of said collecting container and into the same.

In order to separate liquid samples into their individual components, to extract particular components of a liquid sample, or to filter a liquid sample, the liquid sample which can be a solution, colloidal dispersion, or suspension, is introduced (for example, pipetted) into a sample container where it penetrates a separation layer (filter paper, a glass frit, a membrane or material with selective adsorption properties) and enters a collecting container arranged at a distance below the sample container, drop by drop. The sample container and the collecting container are generally of tubular shape, the separation layer abutting the bottom wall of the sample container with the outlet opening formed therein. The outlet opening has a diameter of a few tenths of a millimeter. A plurality of such sample containers is arranged side by side in rows and columns and the containers are interconnected by means of a support plate. The penetration of the separation layer is effected particularly by a partial vacuum on the liquid sample. To this end, a chamber that may be subjected to a partial vacuum, is sealed in an airtight manner with the support plate supporting the sample containers. Within the chamber, there are collecting containers associated with each of the sample containers, which are fitted into and supported in a rack. Such apparatus are used, for example, in medical laboratories for the simultaneous separating of a plurality of liquid samples.

In one aspect, the present invention provides a device for separating liquids of the type mentioned above, wherein contamination of the liquid received by the collecting container is avoided.

According to the invention, the rim of the opening of the collecting container abuts the sample container and/or the outlet spout, without being sealed thereby in an airtight manner, and the end of the outlet spout projects into the collecting container through the opening in the same. Thus, the point of liquid (drop) discharge of the sample container and the contact surface between the sample container and the collecting container do not lie in the same horizontal plane, but are spaced apart vertically, the distance being such that a drop formed at the end of the outlet spout will not contact the surface of the collecting containers. Here, the end of the outlet spout is arranged below the contact surface.

In the device of the present invention, the outlet spout surrounding the outlet opening projects deep into the collecting container. The inner diameter of the outlet spout is 0.1 to 1 mm, preferably about 0.5 mm. The length of the outlet spout, measured from the lower surface of the bottom wall, is 5 to 20 mm, preferably about 6 mm. Thus, the relation between the inner diameter and the length of the outlet spout lays within the range from 0.005 to 0.2, preferably at about 0.08. On all sides around its end (point of liquid or drop discharge), the outlet spout is shielded from adjacent collecting containers by the walls of the collecting container associated with the respective outlet tube. Thereby, contamination is practically excluded. A further protection is provided by the contact between the collecting container and the sample container in the area of the opening of the former. However, this contact should not be absolutely airtight since a partial vacuum (less than 1 atmosphere) is preferably generated and maintained in the collecting container during the separating procedure. In the ideal case, an exchange of air is possible between the collecting container and the sample container without any liquid or aerosols being allowed to escape.

The device of the present invention is particularly suited for apparatus of the kind described above, wherein the liquid samples to be "separated" are suctioned through the separation layer by virtue of a partial vacuum and caught drop by drop by the collecting containers. The not entirely airtight sealing of the collecting container to the environment should also be maintained, however, in the event that no vacuum is used, i.e., when the liquid is pressed through the separation layer by other means, e.g., by a centrifuge. The liquid entering the collecting container in this case would cause a rise in the pressure within the collecting container, were the same sealed in an airtight manner. Therefore, a non-airtight sealing of the collecting container would be preferable in this event, too.

Advantageously, the outlet opening is provided in the bottom wall of the sample container, the collecting container abutting the bottom wall by the rim of its opening. Here, the collecting container does not laterally enclose the sample container, but is entirely arranged below the sample container. The collecting container and the sample container are preferably designed as plastic tubes of a few centimeters in length. The upper end wall of the sample container tube is open and defines the inlet opening, while the lower end wall is closed except for a small outlet. The separation layer lies on this end wall defining the bottom wall, the separation layer thus being supported by the bottom wall. If the material of the separation layer is self-supporting (e.g., a glass frit), no central supporting member at the bottom wall is required.

According to a preferred embodiment of the present invention, it is provided that an annular collar surrounding the outlet spout is formed at the sample container, the collar being shorter than the outlet spout. The collecting container may be loosely connected (i.e., proximal but not tightly or permanently attached) onto this collar. With a loose connection of the collecting container onto the collar, a narrow air-permeable annular gap (vent) is formed. The collar and the collecting container, i.e., its opening, thus form a clearance fit. The collar coaxially surrounding the outlet spout acts as a baffle and contributes to a further reduction of the danger of liquid or aerosols escaping from the collecting container. Preferably, the collar has about half the length of the outlet spout. The sample container, the outlet spout and the collar are advantageously formed integrally.

The sample container with the outlet spout and the collar formed thereon, as well as the collecting container, are preferably provided as plastic parts, preferably molded. This is also pertaining to the situation wherein a plurality of sample containers are arranged on a common support plate (so-called micro-titer plate).

An airtight sealing between the collecting container and the sample container may be provided if, as contemplated in another embodiment of the present invention, a passage channel is provided in the wall of the collecting container, which allows an exchange of air between the interior of the collecting container and the environment (i.e, venting). However, the channel should be provided in the wall of the collecting container above the end of the outlet spout.

A further possible way of venting is to provide a recess or channel in the area of the collecting container abutting the sample container. Due to this recess, the rim of the opening of the collecting container will not provide an airtight sealing of the sample container.

In a further embodiment of the present invention, the collecting container has an air-permeable material provided at the portion abutting the sample container, which prevents the escape of liquid and/or aerosols. Such materials are known and are most often elastic, as for example, fibrillated tetrafluoroethylene, or blown polymeric microfibers or foams. If the collecting containers provided with such air-permeable material are appropriately arranged within the chamber of an apparatus as described above, the collecting containers will abut with pressure the sample containers when the vacuum chamber is closed and the air-permeable material will be compressed by the support plate carrying the sample containers.

According to a further embodiment of the present invention, the collecting container may be abutted (connected) onto the outlet spout by its opening. In this embodiment, the outlet spout is preferably conical down to its end.

As already mentioned before, the invention is particularly suited for implementation in an apparatus in which a plurality of sample containers are arranged closely adjacent to each other so that a simultaneous separation of a plurality of liquid samples is made possible. The sample containers are arranged, for example, side by side in a single row and interconnected (via a sample container strip) or they can be arranged in rows and columns in a two-dimensional matrix and interconnected, the columns being orthogonal in respect of the rows. In any case, each sample container is associated with a collecting container. Since the tubular sample containers lay wall to wall, the collar for abutting (connecting) a collecting container onto a sample container is preferably of a diameter smaller than that of the tubular sample container. This offers the advantage that adjacent sample containers do not have to be spaced apart in order to prevent contamination among the plug-on collecting containers. The rather high packing density of the sample containers, as it is known from the above mentioned apparatus (in conventional microfilter plates, 96 sample containers are accommodated on an area of about 100 $cm_2$), may be maintained. The length dimensions of a standard micro-titer plate are about 12.3 cm by 8.2 cm.

With the device of the present invention, it is possible to perform a physical separation, a chemical separation, or a bio-polymer separation or extraction of liquids containing plant, animal or human cells, and it allows, in particular, to perform the separation of nucleic acids and/or proteins of the cells. To this effect, the liquid in the sample container penetrates a layer of selectively absorbing material, the liquid leaving the layer and entering the collecting container. Preferably, the layer of selectively adsorbing material has chromatographic properties, which can include ion exchange properties or affinity-chromatographic properties, if the layer comprises suitable affinity ligands. A preferred separation layer comprises a fibrillated polytetrafluoroethylene matrix having enmeshed therein sorptive derivatized silica particulate as are disclosed in U.S. Pat. Nos. 4,810,381 and 4,699,717, respectively. Subsequently, the collecting container is replaced by another one, and a liquid containing a solvent is applied on the layer, which selectively removes a certain portion of the material adsorbed in the layer so that it may enter the collecting container. It is essential that this removed material is captured free of any contamination, the uncontaminated condition being ensured even when a partial vacuum is used in the process and a plurality of sample containers, with their collecting containers spaced closely side by side, are used. The releasing of the vacuum in the chamber when replacing the collecting containers is deleterious to the forming of the drops, as mentioned before. However, such replacement of the collecting containers is necessary in bio-polymer separations, since respectively different materials adsorbed in the layer have to be removed and collected several times by applying different liquids containing different solvents. As is appreciated by those skilled in the art, variation in drop characteristics can be due to wetting of the underside of the sample container bottom. In the device of the present invention, the drop inlet point is shifted farther into the collecting containers in proportion to the length of the outlet spout. This eliminates adverse influences on drop characteristics.

In a further embodiment of the invention, the separation layer is retained in abutment against the bottom wall of the sample container by a retaining ring. The retaining ring is inserted in the sample container with a press-fit, i.e., pressing against the inner side of the sample container. The ring is made from a rubbery, preferably a plastic, material.

The separation layer of the device of the present invention may comprise one or several layers. Preferred separation layers comprise a fibrillated polytetrafluoroethylene matrix having sorptive particulate enmeshed therein, as is disclosed, for example, in U.S. Pat. No. 4,810,381. In one embodiment, the separation layer may be formed by two porous fixation means, in particular frits, with particles therebetween. Preferably, the particles can be in the form of bulk material, have chromatographic properties as described before. The preferred particles are made from a material that is based on silica gel, dextran or agarose. Frits may consist of glass, polyethylene (PE) or polytetrafluoroethylene (PTFE) and have a pore size of about 0.1–250 $\mu$m, preferably about 100 $\mu$m.

The thickness of the particle layer is about 1–10 mm, preferably 2.5 mm, with a particle size of 1–300 $\mu$m, preferably 16–23 $\mu$m.

According to a further advantageous embodiment of the present invention, the separation layer has a support membrane in which the adsorptive particles are embedded. Since the support membrane can be rather weak and there being a possibility that it can burst when a partial vacuum is applied on it (of comparatively high pressure difference), a back-up fabric or fibrous layer can be arranged below the support membrane, which provides integrity to the support membrane on the bottom wall of the sample container and preferably consists of a non-woven polyalkylene fibrous material such as polypropylene or polyethylene.

The device of the present invention is not limited to the dimensions of the single parts mentioned herein. Generally, the device of the invention can be produced in any desired size, the above embodiment of the invention for simultaneously separating a plurality of samples is only exemplary and is not limited to the dimensions and other numeric specifications indicated herein.

The following is a detailed description of embodiments of the present invention with reference to the accompanying drawings.

BRIEF DESCRIPTION OF THE DRAWINGS

FIG. 5 is a side elevational view of an apparatus wherein the liquid samples contained in a plurality of sample containers are suctioned through the separation layers by means of a partial vacuum and caught in collecting containers associated with each of the sample containers; and FIG. 6 illustrates a cover plate for the apparatus of FIG. 5, accommodating a plurality of adjacent sample containers.

FIG. 7 is a sectional view similar to FIGS. 1 to 4 showing an alternative embodiment.

DESCRIPTION OF THE PREFERRED EMBODIMENT

Figure 1:
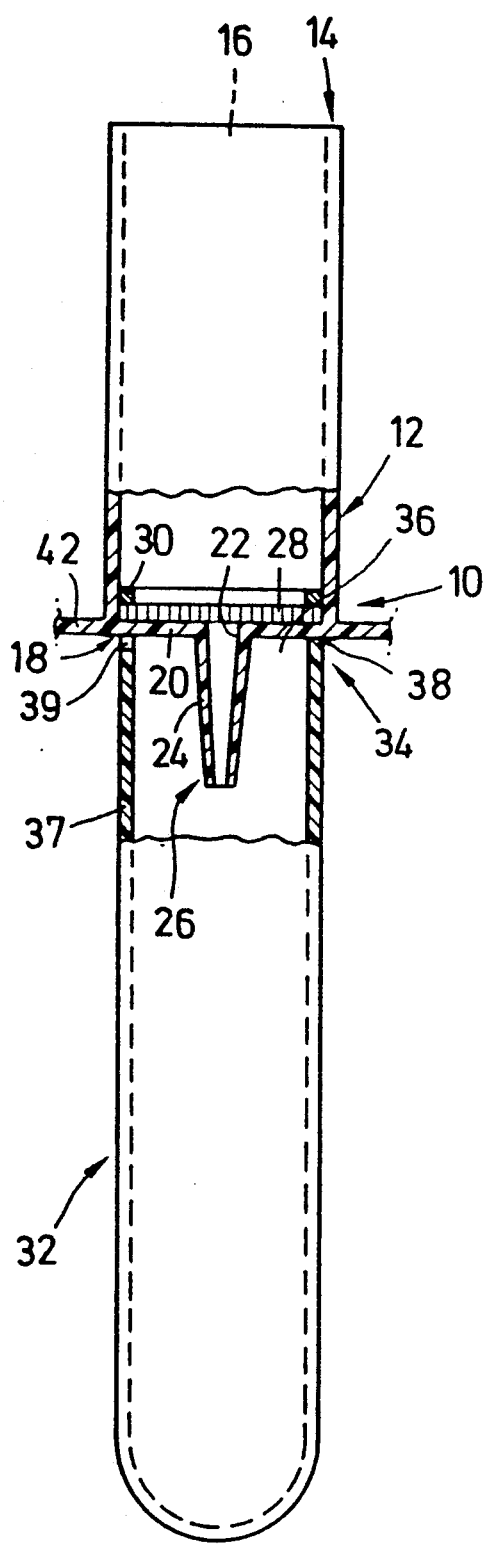
FIGS. 1 to 4 illustrate various embodiments of the device according to the present invention.

FIGS. 1 to 4 illustrate four embodiments of the device according to the present invention. Corresponding elements therein are designated by corresponding reference numerals throughout the following specification.

According to FIGS. 1 to 4, device 10 has a tubular sample container 12, upper end 14 of which is open and defines inlet opening 16 of sample container 12. This inlet opening 16 extends over the entire upper face of the tubular container. The lower face 18 has a circular bottom wall 20. The bottom wall 20 has a central outlet opening 22 provided therein, the outlet having a diameter of a few 1/10 mm (0.2 to 0.9 mm, preferably 0.4 to 0.6 mm). The lower surface of bottom wall 20 has a conical outlet spout 24 formed thereon which encloses the outlet opening 22 and extends in the axial direction of sample container 12. Outlet spout 24 preferably tapers towards its free end 26 and can have a length of up to 2 cm, preferably 0.1 to 1.0 cm, more preferably 0.2 to 1.0 cm, the diameter (optionally decreasing towards the end) being 0.3 to 2.0 mm. Within sample container 12, there is a separation layer 28 of selectively adsorbing material. Layer 28 is made of a membrane with adsorption properties. Layer 28 is disposed on bottom wall 20 of sample container 12 and covers outlet opening 22. A rubbery, preferably plastic, retaining ring 30 pressing against the inner wall of sample container 12 keeps layer 28 set against bottom wall 20. Layer 28 can allow selective adsorption, in particular, of nucleic acids and proteins from liquids containing complete plant, animal or human cells or parts thereof.

Below tubular sample container 12 there is collecting container 32 which preferably is also tubular in shape and can be formed like a test tube. The bottom portion of collecting container 32 may also be conically tapered downward. The diameter of collecting container 32 can equal but preferably is smaller than that of sample container 12; however, collecting container 32 preferably has about 1½ times the axial length of sample container 12. Upper end 34 of collecting container 32 is open; this open end forms opening 36 of collecting container 32. Collecting container 32 abuts lower surface of bottom wall 20 of sample container 12 with rim 38 defining opening 36. Rim 38 of opening 36 does not form an airtight seal with bottom wall 20; rather, an exchange of air between the interior of collecting container 32 and the environment is possible when collecting container 32 abuts bottom wall 20. This exchange of air is necessary if device 10 is implemented in an apparatus in which the sample liquid is suctioned through separation layer 28 into collecting container 32 by means of a partial vacuum. The mounting and supporting of collecting container 32 is not represented in FIG. 1 (and FIGS. 2 to 4) for sake of simplicity; a contemplated support will be described in connection with FIG. 5.

As can be seen in FIG. 1, outlet spout 24 projects far, i.e., a few millimeters up to a few centimeters, into collecting container 32. Therefore, a drop forming at the end 26 of outlet spout 24 does not enter the area of rim 38 of opening 36 from where it could escape due to the fact that collecting container 32 and sample container 12 are not perfectly sealed. Thus, the danger of a contamination, in the case that the devices 10 are arranged in close relationship, is largely excluded since there is a sufficient axial distance between the point of drop discharge (free end 26 of outlet spout 24) and opening 36 of collecting container 32.

In addition, tubular wall 37 of collecting container 32 may be provided with a channel as indicated at 39. In an alternative embodiment, the channel may be machined into rim 38 in the form of a recess (groove). A channel or a recess may also be provided in the devices according to the other embodiments.

Figure 2:
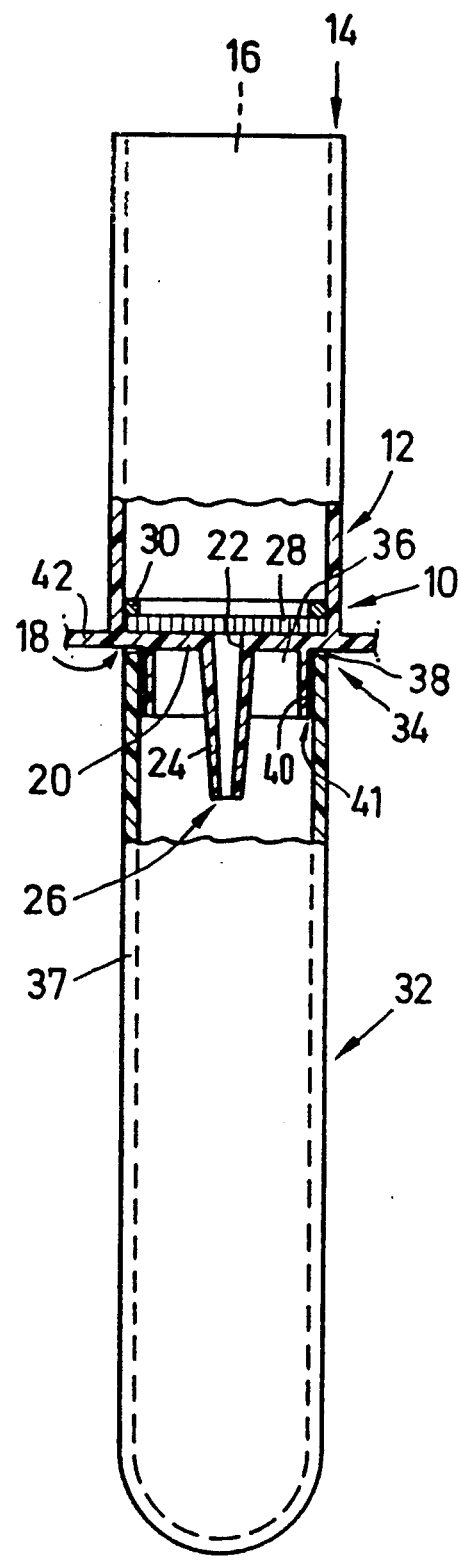

The embodiments of FIG. 2 differs from that in FIG. 1 in that the lower surface of bottom wall 20 of sample container 12 has an axially projecting annular collar 40 formed thereon which coaxially encloses the outlet spout 24. Collar 40 is shorter than outlet spout 24 which projects downwards beyond the end of collar 40 for about half the length thereof. Collecting container 32 is set adjacent collar 40 from outside, the inner wall of the container loosely contacting the exterior of collar 40; thus, there is a clearance fitting between collar 40 and collecting container 32 ensuring non-airtight sealing of collecting container 32, while inhibiting escape of liquid from collecting container 32. FIG. 2 is an exaggerated illustration of the clearance fit, showing it as annular gap 41 allowing an exchange of air between the inside of collecting container 32 and the environment. It is not the primary object of collar 40 to hold collecting container 32 at the sample container 12, but to provide a barrier or baffle against escape of any liquid from collecting container 32. Collar 40 preferably has a length of about 4 mm and a diameter of about 5 to 8 mm, preferably 6.5 mm. Outlet spout 24 projects downward beyond collar 40 preferably by more than 2 mm, thus having a length 6 mm or more. Preferably, sample container 12 and collecting container 32 have an outer diameter of about 8 mm. Given these dimensions, one may arrange 96 sample containers spaced apart at a distance of about 1 mm in a matrix-like manner on a common support plate of micro-titer plate standard. The length by which outlet spout 24 projects downward beyond the collar 40 should at least be half the diameter of the largest possible liquid drop.

Figure 3:
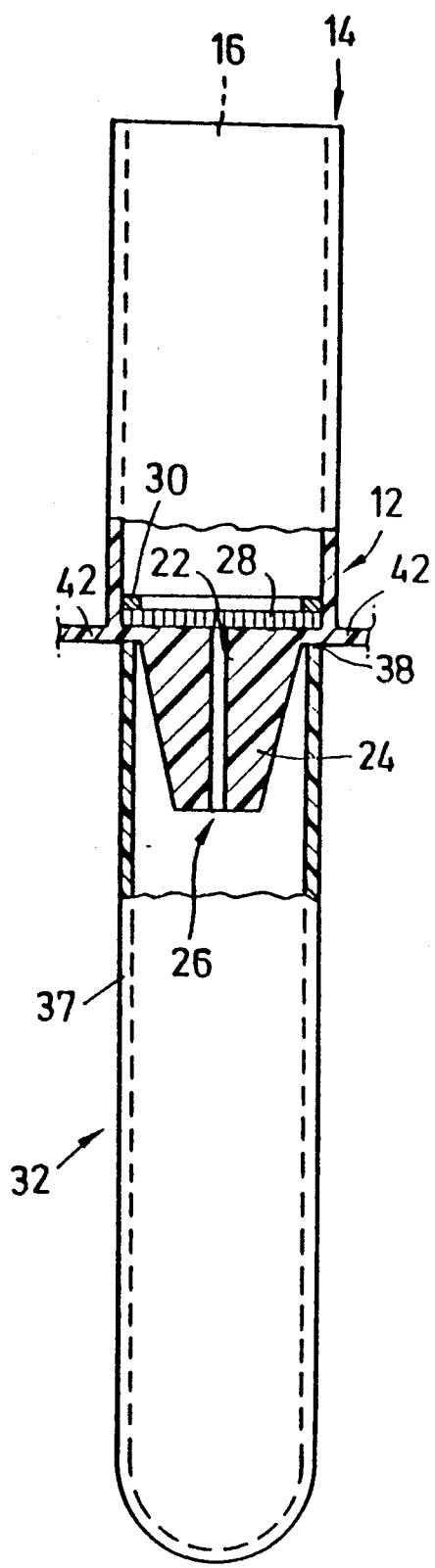

FIG. 3 illustrates an embodiment in which collecting container 32 may be plugged onto conically tapered outlet spout 24 from outside. In the connected state, this embodiment does not provide an airtight sealing between collecting container 32 and outlet spout 24 or sample container 12, either. In this embodiment, outlet spout 24 has a larger outer diameter than in embodiments of FIGS. 1 and 2.

Figure 4:
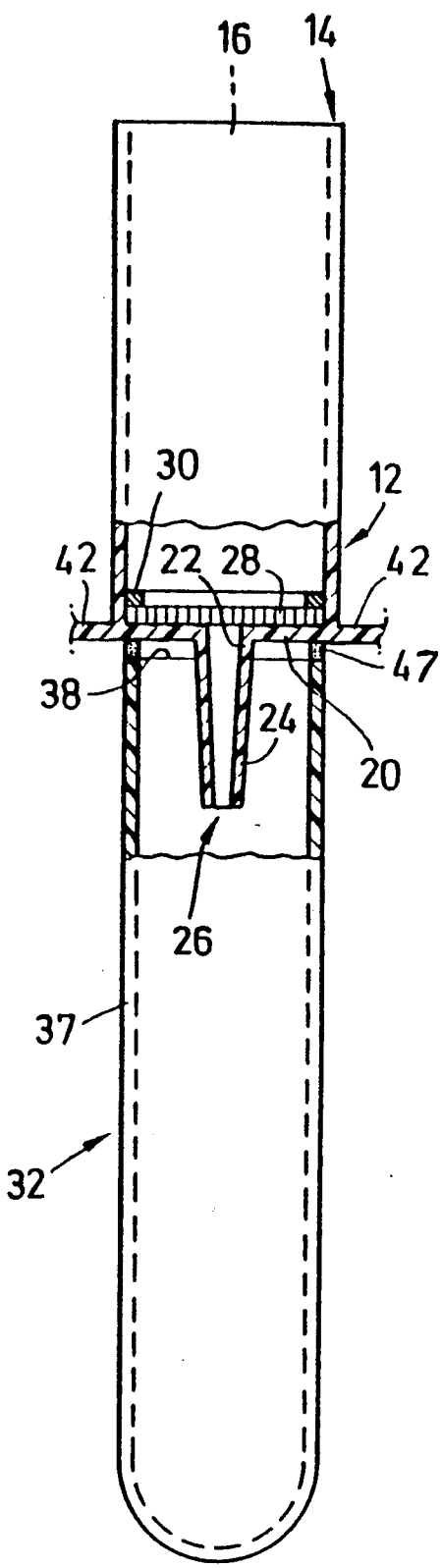

A further embodiment of device 10 according to the present invention is illustrated in FIG. 4. This embodiment substantially corresponds to that of FIG. 1, except that rim 38 of opening 36 of collecting container 32, is provided with a ring 47 of a porous, preferably hydrophobic, material (e.g., PE, PTFE) that is permeable to air, on the one hand, and, on the other hand, impermeable to liquids. Ring 47 abuts bottom wall 20.

As illustrated in FIGS. 1 to 4 at 42, bottom wall 20 of a sample container 12 is part of a support plate by which a plurality of sample containers 12 are interconnected. Support plate 42 may be e.g., a micro-titer plate to which, for example, 96 sample containers are formed integrally. Support plate 42, sample containers 12 and outlet spouts 24 and, in the case of the embodiment of FIG. 2, collar 40 are integrally connected and preferably are molded plastic parts. In a manner known in the art, support plate 42 seals a partial vacuum chamber 66 in which collecting containers 32 are arranged.

Since the point of drop discharge (lower end 26 of outlet spout 24) is arranged at a relatively great distance, compared to the diameter of a liquid drop, typically about 50 μl, to (lower surface of) bottom wall 20 and, thereby, to the contact surface between sample container 12 and collecting container 32, a liquid drop will not contact bottom wall 24 or collar 40, not even after the vacuum on the device is released. Thus, the liquid drop is fully received by the collecting container 32 arranged therebelow and does not impinge the external area of this collecting container so that contamination of the liquid contained in an adjacent collecting container is essentially excluded.

FIGS. 5 and 6 illustrate an apparatus, and parts thereof, wherein liquid samples contained in a plurality of sample containers are suctioned through the separation layers into collecting containers by means of a partial vacuum. Each sample container has a collecting container associated thereto. Apparatus 43 has a rectangular bottom housing part 44 that is open to the top and has a seal 46 provided in the edge defining its opening. In one of the side walls of bottom housing part 44 there is provided connecting piece 48 for suction hose 49 of a vacuum pump (not illustrated). Bottom housing part 44 accommodates a rack 50 in which a plurality of receiving openings are provided in adjacent rows and columns for insertion and support of collecting containers 32.

A supporting frame member 52 is set on bottom housing part 44, which rests on seal 46. A suitable configuration of supporting frame member 52 and bottom housing part 44 prevents lateral displacement of supporting frame member 52 relative to bottom housing part 44. Supporting frame member 52 carries a rectangular block of material 54 (generally of plastic material) disposed with its rim on rubbery seal 56 provided at supporting frame member 52. Block of material 54 has a plurality of vertical wells 58 (cell wells) arranged in rows and columns that form the sample containers. The positions of wells 58 correspond to those of collecting containers 32 in rack 50. Each well 58 is in alignment with one collecting container 32.

Lower ends of wells 58 are closed, except for a small central channel (opening). On the bottom of wells 58, the separation layers are arranged covering the channels in the bottom. On the lower surface of material block 54 facing to collecting containers 32 there is one conical outlet spout 60 provided for each well, respectively, which protrudes into the associated collecting container 32 when material block 54 is installed on supporting frame member 52. The rim of the opening of the collecting container will then abut the lower surface of material block 54. Contact between a collecting container 32 and lower surface of the material block 54 can be effected in one of the ways described in connection with FIGS. 1 to 4.

Bracket hook 62 is provided on each of two opposite outer walls of bottom housing part 44 with which tensioning bracket 64 may be tightened, the bracket bridging the block of material 54 and pressing the same against the supporting frame member 52 which in turn is pressed against bottom housing part 44. Due to seals 46 and 56, chamber 66 which is defined by the bottom housing part 44, supporting frame member 52 and block of material 54, is sealed airtight. Upon generating a partial vacuum in chamber 66, the liquid samples in wells 58 are suctioned (under partial vacuum) through the respective separation layers, reaching respective collecting containers 32 via outlet spouts 60. Due to the "liquid tight" sealing of collecting containers 32 (see embodiments of FIGS. 1 to 4), a contamination-free operation is ensured.

FIG. 6 illustrates an apertured plate 68 implemented instead of the material block 54, used in the apparatus of FIG. 5, if a sample container strip 70 of a plurality of interconnected sample containers 12 is arranged side by side in a row. In the case represented in FIG. 6, eight sample containers 12 form a sample container strip 70. Interconnected sample containers 12 are surrounded by a flange 72 extending rectangular to the axial direction of sample containers 12. Flange 72 is arranged at about half the height of sample containers 12. Sample container strip 70 is set upon apertured plate 68, the lower part of sample containers 12 penetrating openings 74 until the lower surface of flange 72 abuts the upper surface of the apertured plate 68. The area between the individual openings 74 in the apertured plate 68 is also recessed so that, all in all, oblong opening 76 with a wave-shaped edge is formed. Around this oblong opening 76, the upper surface of apertured plate 68 has a seal 78 disposed thereon which is inserted in a groove and on which the lower surface of flange 72 rests.

FIG. 7 illustrates a modified embodiment of the invention showing a porous material 80, such as polyalkylene, polytetrafluoroethylene, or paper, positioned between separation layer 28 and bottom wall 20 within the confines of sample container 12. Bottom wall 20 comprises one or more radially disposed grooves 82 and having fibrous material 80 overlaying grooves 82.

Various modificatiors and alterations of this invention will become apparent to those skilled in the art without departing from the scope and spirit of this invention, and it should be understood that this invention is not to be unduly limited to the illustrative embodiments set forth herein.

We claim:

1. A device for separating a liquid sample, comprising
   a sample container (12) having an inlet opening (16) and an outlet opening (22) between which a separation layer (28) is arranged, said sample container having a bottom wall (20) in which said outlet opening (22) is located,
   a collecting container (32), for liquid emerging through said outlet opening (22), having a tubular wall (37) and a rim (38) which defines an opening (36) therein, and
   an outlet spout (24) joining and enclosing said outlet opening (22), said sample container (12) having a unperforated collar (40) formed thereon that is a barrier for, and coaxially surrounds, said outlet spout (24), unperforated collar (40) being shorter than said outlet spout (24), said a perforated collar (40) being located within collecting container (32), and
   wherein said collecting container (32) abuts at least one of said sample container (12) and said outlet spout (24) adjacent to said rim (38), without providing an airtight sealing, and
   an end of said outlet spout (24) extending through said opening (36) of said collecting container (32) and into the same.

2. The device of claim 1, wherein said collecting container (32) abuts said bottom wall (20) adjacent said rim (38).

3. The device of claim 1 wherein said collecting container (32) is loosely connected onto said unperforated collar by its opening (36) to provide a non-airtight seal.

4. The device of claim 3, wherein said unperforated collar (40) is about one-half the length of said outlet spout (24).

5. The device of claim 3, wherein said sample container (12), said outlet spout (24) and said unperforated collar (40) are formed integrally.

6. The device of claim 1, further comprising a channel (39) which is provided in said tubular wall (37) of said collecting container (32).

7. The device of claim 1, further comprising a recess (39) in the rim (38) of said collecting container (32) abutting said sample container (12).

8. The device of claim 1, wherein said abutting portion of collecting container (32) is provided with a ring of porous material (47) permeable to air which prevents the escape of liquid and aerosols.

9. The device of claim 1, wherein said collecting container (32) is plugged onto said outlet spout (24) at its opening (36).

10. The device of claim 1, wherein said outlet spout (24) tapers conically towards its end.

11. The device of claim 1, wherein said sample container (12) is substantially tubular in shape.

12. The device of claim 1, wherein said separation layer (28) is retained in abutment on said bottom wall (20) of said sample container (12) by a retaining ring (30), said retaining ring (30) being radially supported on the inner sides of said sample container (12).

13. The device of claim 1 comprising a plurality of sample containers (12), each having an outlet spout (24) with an end (26), and a plurality of collecting containers (32), each of said sample containers (12) having a respective collecting container (32) associated therewith, said sample containers being arranged side by side.

14. The device of claim 13 wherein said plurality of sample containers (12) has a common circumferential flange (72).

15. The device of claim 13 further comprising a chamber (66) which is subjected to a partial vacuum, into which said plurality of sample containers and said plurality of collecting containers (32) are inserted.

16. The device of claim 1 comprising a plurality of sample containers (12), each of said plurality of sample containers (12) being associated with a respective collecting container (32), which are provided in rows and columns, the columns being orthogonal relative to said rows, and wherein said plurality of sample containers are interconnected.

17. The device of claim 1 for use wherein said liquid sample comprises components selected from the class consisting of nucleic acids or proteins of plant, animal or human cells and wherein said separation layer comprises a material for selectively absorbing at least one of said components in said liquid sample.

18. The device of claim 17, wherein said selectively absorbing material is a layer of particles and said layer of particles is enclosed between two fixation means.

19. The device of claim 17, wherein said selectively adsorbing material is at least one of silica gell, dextran, agarose, or a derivative thereof.

20. The device of claim 1 wherein said separation layer (28) comprises a membrane having sorptive properties.

21. A method for the separation or extraction of biopolymers, comprising the steps of
providing a device according to claim 1 and pressing or suctioning a liquid sample containing at least one bio-polymer through said separation layer (28) to effect a separation of said liquid sample.

22. The method according to claim 21 wherein said at least one bio-polymer is a nucleic acid or protein of plant, animal, or human cells.

23. The device according to claim 1 further comprising additional separation layers (28).

24. The device according to claim 1 wherein said separation layer comprises a fibrillated polytetrafluoroethylene matrix having sorptive particulate emeshed therein.

* * * * *

UNITED STATES PATENT AND TRADEMARK OFFICE
CERTIFICATE OF CORRECTION

PATENT NO. 5,264,184

DATED : November 23, 1993

INVENTOR(S): James E. Aysta et al.

It is certified that error appears in the above-indentified patent and that said Letters Patent is hereby corrected as shown below:

Col. 1, line 57, "drops 11" should read -- drops will --.

Col. 2, line 6, after "the" insert -- subsequent analysis --.

Col. 4, line 66, "100 $cm_2$" should read -- 100 $cm^2$ --.

Col. 10, line 19, "a perforated" should read -- unperforated --.

Col. 11, line 7 after "sample containers" insert —(12)— containers" insert -- (12) --.

Col. 11, line 17 plurality of sample" should read -- said sample --.

Col. 11, line 22 (fourth line of claim 17), after "separation layer" insert —(28)--.

UNITED STATES PATENT AND TRADEMARK OFFICE
CERTIFICATE OF CORRECTION

PATENT NO. : 5,264,184

DATED : November 23, 1993

INVENTOR(S) : James E. Aysta et al.

It is certified that error appears in the above-identified patent and that said Letters Patent is hereby corrected as shown below:

Col. 12, line 5 (second line of claim 19), "gell" should read —gel—.

Signed and Sealed this

Seventeenth Day of January, 1995

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,264,184
DATED : November 23, 1993
INVENTOR(S) : James E. Aysta et al.

It is certified that error appears in the above-indentified patent and that said Letters Patent is hereby corrected as shown below:

On the title page, under [73] Assignee, after "Minn.", kindly add -- , and Diagen Institut fur molekularbrologische Diagnostik, GmbH, of Duesseldorf, Germany --.

Signed and Sealed this

Nineteenth Day of March, 1996

Attest:

BRUCE LEHMAN

Attesting Officer

Commissioner of Patents and Trademarks